United States Patent [19]

Cheung et al.

[11] Patent Number: 4,779,657

[45] Date of Patent: Oct. 25, 1988

[54] RUBBER COMPOSITIONS

[75] Inventors: Seung T. Cheung; Richard S. Steevensz, both of Sarnia, Canada

[73] Assignee: Polysar Limited, Sarnia, Canada

[21] Appl. No.: 137,979

[22] Filed: Dec. 28, 1987

[51] Int. Cl.$^4$ .................................................. C08K 3/04
[52] U.S. Cl. ..................................... 152/510; 152/511; 524/496; 524/574
[58] Field of Search ................ 152/510, 511; 524/574, 524/496

[56] References Cited

U.S. PATENT DOCUMENTS

| | | |
|---|---|---|
| 2,539,523 | 1/1951 | Reid, Jr. . |
| 3,928,297 | 12/1975 | Thaler et al. ........................ 525/354 |
| 3,948,868 | 4/1976 | Powers . |
| 4,215,022 | 7/1980 | Buckley et al. ...................... 524/554 |
| 4,675,355 | 6/1987 | Hirata et al. ........................ 524/571 |

OTHER PUBLICATIONS

Frederick Marchionna, "Recent Advances in Butalastic Polymers", vol. 1, pp. 444–445, 1954.

Primary Examiner—Herbert J. Lilling
Attorney, Agent, or Firm—Stevens, Davis, Miller & Mosher

[57] ABSTRACT

An improved rubber composition for use in articles requiring reduced permeability to air, comprises:
one hundred parts by weight of a terpolymer of isobutylene, isoprene and α-methylstyrene,
from about 30 to about 90 parts by weight of at least one carbon black, and
a curing system,
wherein the terpolymer comprises from about 0.5 to about 2 mole percent of isoprene, from about 2 to about 7 mole percent of α-methylstyrene and from about 91 to about 97.5 mole percent of isobutylene.

12 Claims, No Drawings

RUBBER COMPOSITIONS

FIELD OF THE INVENTION

This invention relates to polymer compositions and vulcanizates thereof. More particularly, it relates to compositions useful for the manufacture of articles requiring low or reduced permeability to gases, in general, and to pneumatic tire inner liners and tubes, in particular.

BACKGROUND OF THE INVENTION

Butyl rubbers are copolymers of isobutylene with small amounts of a conjugated diene, usually isoprene, which provides double bonds allowing the rubber to be vulcanized with sulphur and other vulcanizing agents. Butyl rubbers possess a variety of inherently satisfactory properties which has enabled them to find utility in many commercial areas. Among their satisfactory inherent properties are their impermeability to air, high damping of low frequency vibrations, and good resistance to aging, heat, acids, bases, ozone and other chemicals after vulcanization, which renders them well suited for use in a variety of applications including articles requiring low or reduced permeability to air. Examples of such articles include, but are not limited to, tire inner tubes, tire curing bladders and various other air bladders. In the tire industry's continuing quest for improved inner tubes and liners, an elastomeric compound which, after vulcanization, exhibits a reduction in air permeability over conventional inner tubes and liners would be desirable.

DESCRIPTION OF THE PRIOR ART

U.S. Pat. No. 2,539,523 (Reid) discloses a process for the terpolymerization of an iso-olefin, conjugated diene and a nuclearly substituted alpha alkyl (e.g. methyl, ethyl, propyl) styrene monomer in the presence of a solvent and a Friedel-Crafts catalyst, at a temperature of from $-10°$ to $-150°$ C. Further, as the terpolymerization is carried out, additional amounts of the catalyst and of the most reactive olefin, usually the nuclearly substituted alpha alkyl styrene, are periodically or continuously introduced into the recator such that the composition of the reactant mixture remains essentially constant; this results in a terpolymer of uniform composition and properties.

Marchionna, F. (see "Recent Advances in Butalistic Polymers (1954)", volume 1, pages 444 to 445) teaches that when a 77:3:20 mixture of isobutylene-butadiene-α-methylstyrene is polymerized at $-105°$ C., "vulcanizable, hard and brittle heteropolymers are obtained, having limited flexibility".

U.S. Pat. No. 3,948,868 (Powers) discloses a process for the production of isobutylene-isoprene-styrene terpolymers. Specifically, a feed stream comprising 0.5 to 30 weight percent of isoprene, 0.5 to 30 weight percent of styrene and the remainder isobutylene is polymerized in the presence of a Friedel-Crafts catalyst at a temperature of from $-30°$ to $-100°$ C.

SUMMARY OF THE INVENTION

It is an objective of the present invention to provide a rubber composition for use in articles requiring reduced permeability to air, which composition, after vulcanization possesses very low permeability to gases, while also maintaining a suitable balance of other physical properties.

It is a further objective of the present invention to provide a rubber composition which is suitable for use in pneumatic tire inner tubes and liners.

Accordingly, the present invention provides a rubber composition for use in articles requiring reduced permeability to air, said composition comprising:

one hundred parts by weight of a terpolymer of isobutylene, isoprene and α-methylstyrene, from about 30 to about 90 parts by weight of at least one carbon black, and a curing system, wherein, said terpolymer comprises from about 0.5 to about 2 mole percent of isoprene, from about 2 to about 7 mole percent of α-methylstyrene and from about 91 to about 97.5 mole percent of isobutylene.

DETAILED DESCRIPTION OF THE INVENTION

It has been found, surprisingly and unexpectedly, that a terpolymer comprising from about 0.5 to about 2 mole percent of isoprene, from about 2 to about 7 mole percent of α-methylstyrene and from about 91 to about 97.5 mole percent of isobutylene exhibits, after compounding and vulcanization, reduced permeability to air, when compared to a vulcanizate derived from standard butyl rubber.

The method of producing the terpolymer of isobutylene, isoprene and α-methylstyrene suitable for use in the present invention is not particularly restricted. In a preferred embodiment, the method of producing said terpolymer comprises contacting a solution of isobutylene, isoprene and α-methylstyrene in a halogenated hydrocarbon, more preferably methyl chloride, with a catalyst system comprising at least one Lewis acid, more preferably aluminum trichloride, preferably a mixture of aluminum trichloride and diethyl aluminum chloride, in a molar ratio from 1:0 to 1:6 most preferably 1:4 at a temperature of from about $-85°$ to about $-100°$ C. to a suitable polymerization conversion level which provides a terpolymer comprising from about 0.5 to about 2 mole percent of isoprene, from about 2 to about 7 mole percent of α-methylstyrene and from about 91 to about 97.5 mole percent of isobutylene.

In a preferred embodiment, a terpolymer suitable for use in the composition of the present invention comprises from about 0.5 to about 2 mole percent of isoprene, from about 4 to about 7 mole percent of α-methylstyrene and from about 91 to about 95.5 mole percent of isobutylene.

The use of carbon blacks for reinforcement of vulcanizates is well known in the art and results in improved strength properties of the final vulcanizates. Suitable carbon blacks for practicing this invention include the well known furnace and channel, preferably furnace, blacks and are used in amounts of from about 30 to about 90, preferably from about 50 to about 70, parts by weight.

The curing system suitable for use in the present invention is not particularly restricted. A typical curing system comprises: (i) a metal oxide, (ii) optionally, elemental sulphur and (iii) at least one sulphur based accelerator. The use of metal oxides as a component in the curing system is well known in the art. A suitable metal oxide is zinc oxide, which may be used in amounts of from about 1 to about 10, preferably from about 2 to about 5, parts by weight. Elemental sulphur, comprising component (ii) of said curing system, when present, may be used in amounts of from about 0.2 to about 2 parts by weight. Suitable sulphur based accelerators (component (iii) of said curing system) may be used in amounts of from about 0.5 to about 3 parts by weight and include the thiuram sulphides such as tetramethylthiuram disulphide (TMTD), the thiocarbamates such as zinc dimethyl dithiocarbamate (ZDC) and the thiazyl and benzothiazyl compounds such as mercaptobenzothiazyl disulphide (MBTS). Preferably, the sulphur based accelerator is tetramethylthiuram disulphide.

Stabilizers, anti-oxidants, hydrocarbon extender oils and tackifiers may also be added as is well known in the art of compounding butyl-type rubber polymers.

The compositions according to the present invention can be prepared by the well known methods for mixing of rubbery polymers including mixing on a rubber mill or in internal mixers of the Banbury or Brabender variety. In the compounding procedure, the conventional compounding ingredients are incorporated. Generally, it is preferred to add the cure active agents of the curing system in a second stage of compounding which may be on a rubber mill or in an internal mixer operated at a temperature normally not in excess of about 110° C. The compounds are cured in a conventional manner by heating for from about 5 to about 120 minutes at temperatures of from about 150° to about 200° C. to form elastomeric vulcanizates having useful properties as described herein.

When rubber compositions according to this invention are vulcanized as described above, the vulcanizates exhibit, both surprisingly and without scientific explanation, a reduction in air permeability while maintaining a desirable balance of other physical properties rendering said vulcanizates suitable for use in articles requiring low or reduced permeability to air. By a reduction in air permeability is meant a reduction in the volume of air that passes through a unit area of defined thickness of vulcanizate per unit of time. By physical properties is meant vulcanization characteristics. Accordingly, said vulcanizates are suitable for use in articles requiring low or reduced permeability to air while maintaining a desirable balance of other physical properties. Examples of such articles may include, but are not limited to, pneumatic tire inner liners and tubes, and rubbery membrane materials suitable for use in the production of air bladders and the like.

The following examples illustrate the present invention and are not intended to limit the scope thereof. All parts are parts by weight unless otherwise specified.

EXAMPLE 1

Four terpolymers of isobutylene, isoprene and α-methylstyrene were produced according to the following procedure. All monomers, solvents and chemical reagents were purified to ensure water and other impurities were not present during polymerization. Isobutylene, isoprene, α-methylstyrene and methyl chloride were charged, according to the feed compositions shown in Table I, into a stainless steel reactor which was equipped with an agitation means and a cooling means. A catalyst solution was prepared by combining (i) 200 ml of a methylene chloride solution comprising one gram of $AlCl_3$, with (ii) 20 ml of a hexane solution comprising 20% $Et_2AlCl$ by volume. The reactor containing the monomer solution was cooled to about −90° C., after which 40 ml of said catalyst solution was introduced into the reactor. The polymerization was conducted: at a temperature of less than about −85° C., under a nitrogen blanket, under vigorous agitation and to a conversion level of from about 10% to about 20% conversion. The polymerization was terminated by the addition of a small amount of methanol. The terpolymers were recovered by coagulation in a large excess of methanol and evaporation of methyl chloride solvent. The terpolymers were then purified by redissolving in hexane, followed by recoagulating from methanol.

TABLE I

|  | FEED COMPOSITION | | | |
|---|---|---|---|---|
|  | A | B | C | D |
| Methyl chloride (g) | 2750 | 2750 | 2750 | 2750 |
| Isobutylene (g) | 625 | 625 | 625 | 625 |
| Isoprene (g) | 17 | 20 | 34 | 34 |
| α-Methylstyrene (g) | 27 | 32 | 46 | 46 |

EXAMPLE 2

Using the four terpolymers produced in Example 1, four rubber compositions were prepared according to the recipes shown in Table II, wherein each terpolymer is identified in respect of the feed composition used to prepare it. The terpolymer (as indicated) and carbon black were ram mixed for 20 seconds in a miniature internal mixer equipped with a Brabender mixing head and operated at a temperature of about 90° C. and rotor speed of 63 revolutions per minute, after which all of the remaining ingredients were added to the mixer. After a total mixing time of 5 minutes, the composition was dumped, cooled to room temperature and vulcanized for 30 minutes at a temperature of 166° C.

TABLE II

|  | SAMPLE # | | | |
|---|---|---|---|---|
|  | 1 | 2 | 3 | 4 |
| Terpolymer A | 100 | — | — | — |
| Terpolymer B | — | 100 | — | — |
| Terpolymer C | — | — | 100 | — |
| Terpolymer D | — | — | — | 100 |
| Carbon black IRB #6 | 50 | 50 | 50 | 50 |
| Stearic acid | 1 | 1 | 1 | 1 |
| Zinc oxide | 3 | 3 | 3 | 3 |
| Tetramethyl thiuram disulphide | 1 | 1 | 1 | 1 |
| Sulphur | 1.75 | 1.75 | 1.75 | 1.75 |

The contents of α-methylstyrene and isoprene in the raw polymers were determined by standard nuclear magnetic resonance (NMR) spectroscopy techniques. Glass transition temperature of the raw polymers was measured according to ASTM D3418-82.

The rheological characteristics of the compositions were determined according to ASTM D2084-87. The cure meter was operated at a test temperature of 160° C.

The vulcanizates of the rubber compositions were then tested for permeability to air. In this test a vulcanized rubber sheet was placed into a permeability test cell at which point a positive gas pressure of 0.34 MPa was applied to one side of the sheet. The test cell containing the specimen was pre-conditioned for 24 hours at room temperature to allow the system to establish an equilibrium prior to actual testing, after which the test cell was mounted in a constant temperature bath at 65° C. The gas permeating the specimen displaced a liquid from a graduated capillary tube, permitting a direct measurement of the volume. Accordingly, the reported value (Q) for air permeability represents the volume of air passing, per second, through a specimen of 1 cm² area and 1 cm thickness when the difference in pressure across the specimen is 1 atmosphere.

The test results are provided in Table III. The CONTROL 1 shown in Table III was derived from a rubber composition comprising: 100 parts by weight of butyl rubber (commercial product sold as POLYSAR® Butyl 301, having a Mooney viscosity (ML 1+8 at 125° C.) of from about 47 to about 57); 50 parts by weight of carbon black IRB #6; 1 part by weight of stearic acid, 3 parts by weight of zinc oxide; 1 part by weight of tetramethyl thiuram disulphide; and 1.75 parts by weight of sulphur. An examination of the test results provided in Table III indicates that the use of α-methylstyrene as an additional monomer in the polymerization of isobutylene and isoprene results in an improved polymer, the vulcanizate of which exhibits significantly reduced air permeability when compared to a vulcanizate of standard butyl rubber. Thus, the rubber composition of this invention is useful in the manufacture of articles requiring low or reduced air permeability, in general, and in pneumatic tire inner tubes and liners, in particular.

TABLE III

|  | CONTROL | SAMPLE # | | | |
|---|---|---|---|---|---|
|  | 1 | 1 | 2 | 3 | 4 |
| Raw Polymer Property |  |  |  |  |  |
| α-Methylstyrene content (mole %) | — | 4.1 | 4.1 | 5.9 | 5.3 |
| Isoprene content (mole %) | 1.6 | 0.6 | 1.2 | 1.5 | 1.3 |
| Tg (°C.) | −68 | −72 | −69 | −71 | −71 |
| Rheometry at 160° C. |  |  |  |  |  |
| $M_H$ (dN.m) | 72 | 6 | 36 | 44 | 12 |
| $M_L$ (dN.m) | 17 | 1 | 2 | 2 | 1 |
| t(10) (min.) | 3 | 17 | 7 | 7 | 6 |
| t(50) (min.) | 8 | 27 | 17 | 13 | 22 |
| t(90) (min.) | 33 | 40 | 36 | 29 | 40 |
| Permeability to air (vulcanizate preconditioned 24 hrs at room temp. and 0.34 MPa) at 65° C., $Q \times 10^8$ | 3.2 | 2.1 | 2.3 | 2.1 | 2.3 |

EXAMPLE 3

Four terpolymers of isobutylene, isoprene and styrene were prepared according to (i) the polymerization procedure provided in Example 1, and (ii) the feed compositions provided in Table IV.

These four terpolymers were then incorporated into rubber compositions according to the recipes shown in Table V, wherein each terpolymer is identified in respect of the feed composition used to prepare it. After banding the raw polymer for about one minute on a micro mill operated at a temperature of 60° C., the carbon black and hydrocarbon extender oil were then added to the terpolymer on the mill. After removing the mixture from the mill and cooling to room temperature, the remaining ingredients were added to the mixture on a mill operated at room temperature.

Raw polymer properties, rheometric properties and permeability to air properties were measured as described in Example 2 and are provided in Table IV. CONTROL 2 of Table VI was derived from a rubber composition comprising: 100 parts by weight of butyl rubber (commercial product sold as POLYSAR® Butyl 301 as hereinbefore described); 48 parts by weight of carbon black N-550; 15 parts by weight of Sunpar 2280 (hydrocarbon extender oil); 1.5 parts by weight of stearic acid; 5 parts by weight of zinc oxide; 1 part by weight of tetramethyl thiuram disulphide; and 1.75 parts by weight of sulfur. These properties indicate that vulcanizates produced from terpolymers of isobutylene, isoprene and styrene, which are outside the scope of the present invention, do not exhibit significantly reduced permeability to air. Accordingly, the incorporation of such a terpolymer in a rubber composition for use in articles requiring reduced permeability to air does not appear to be advantageous. This example serves to illustrate that the reduced air permeability of vulcanizates derived from terpolymers of isobutylene, isoprene and α-methylstyrene as hereinbefore described is indeed surprising and unexpected.

TABLE IV

|  | FEED COMPOSITION | | | |
|---|---|---|---|---|
|  | E | F | G | H |
| Methyl chloride (g) | 294 | 294 | 294 | 294 |
| Isobutylene (g) | 48 | 48 | 48 | 48 |
| Isoprene (g) | 2.2 | 2.2 | 2.2 | 2.2 |
| Styrene (g) | 4.5 | 9 | 18 | 27 |

TABLE V

|  | SAMPLE # | | | |
|---|---|---|---|---|
|  | 5 | 6 | 7 | 8 |
| Terpolymer E | 100 | — | — | — |
| Terpolymer F | — | 100 | — | — |
| Terpolymer G | — | — | 100 | — |
| Terpolymer H | — | — | — | 100 |
| Carbon black N-550 | 48 | 48 | 48 | 48 |
| Sunpar 2280 | 15 | 15 | 15 | 15 |
| Stearic acid | 1.5 | 1.5 | 1.5 | 1.5 |
| Zinc oxide | 5 | 5 | 5 | 5 |
| Tetramethyl thiuram disulphide | 1 | 1 | 1 | 1 |
| Sulphur | 1.75 | 1.75 | 1.75 | 1.75 |

TABLE VI

|  | CONTROL | SAMPLE # | | | |
|---|---|---|---|---|---|
|  | 2 | 5 | 6 | 7 | 8 |
| Raw Polymer Property |  |  |  |  |  |
| Styrene content (mole %) | — | 1.5 | 4.0 | 10.7 | 11.8 |
| Isoprene content (mole %) | 1.5 | 1.5 | 1.7 | 1.2 | 2.1 |
| Tg (°C.) | −67 | −66 | −66 | −64 | −63 |
| Rheometry at 160° C. |  |  |  |  |  |
| $M_H$ (dN.m) | 65 | 49 | 44 | 30 | 37 |
| $M_L$ (dN.m) | 9 | 5 | 4 | 3 | 3 |
| t(10) (min.) | 3 | 3 | 4 | 4 | 4 |
| t(50) (min.) | 5 | 7 | 8 | 8 | 8 |
| t(90) (min.) | 15 | 17 | 20 | 20 | 21 |
| Permeability to air (vulcanizate preconditioned 24 hrs at room temp. and 0.34 MPa) at 65° C., $Q \times 10^8$ | 4.1 | 4.1 | 3.8 | 4.3 | 5.9 |

What is claimed is:

1. A rubber composition for use in articles requiring reduced permeability to air, said composition comprising:
   one hundred parts by weight of a terpolymer of isobutylene, isoprene and α-methylstyrene,
   from about 30 to about 90 parts by weight of at least one carbon black, and
   a curing system,
   wherein, said terpolymer comprises from about 0.5 to about 2 mole percent of isoprene, from about 2 to about 7 mole percent of α-methylstyrene and from about 91 to about 97.5 mole percent of isobutylene.

2. The composition of claim 1, wherein said terpolymer comprises from about 0.5 to about 2 mole percent of isoprene, from about 4 to about 7 mole percent of α-methyl styrene and from about 91 to about 95.5 mole percent of isobutylene.

3. The composition of claim 1, wherein said terpolymer is produced by a process which comprises contacting a halogenated hydrocarbon solution of isobutylene, isoprene and α-methylstyrene with a catalyst system comprising at least one Lewis acid at a temperature of from about −85° to about −100° C.

4. The composition of claim 3, wherein said halogenated hydrocarbon is methyl chloride.

5. The composition of claim 3, wherein said catalyst system comprises aluminum trichloride.

6. The composition of claim 4, wherein said catalyst system comprises a mixture of aluminum trichloride and diethyl aluminum chloride in a molar ratio from 1:0 to 1:6.

7. The composition of claim 1, wherein said curing system comprises from about 1 to about 10 parts by weight of zinc oxide, from about 0.2 to about 2 parts by weight of elemental sulphur and from about 0.5 to about 3 parts by weight of at least one sulphur based accelerator.

8. The composition of claim 7, wherein the amount of said zinc oxide is from about 2 to about 5 parts by weight.

9. Vulcanizates of the composition of claim 7.

10. A pneumatic tire having an inner tube or liner comprising the vulcanizate of claim 9.

11. Vulcanizates of the composition of claim 1.

12. A pneumatic tire having an inner tube or liner comprising the vulcanizate of claim 11.

* * * * *